(No Model.)
U. E. DODGE.
ASH SIFTER.
No. 279,724. Patented June 19, 1883.
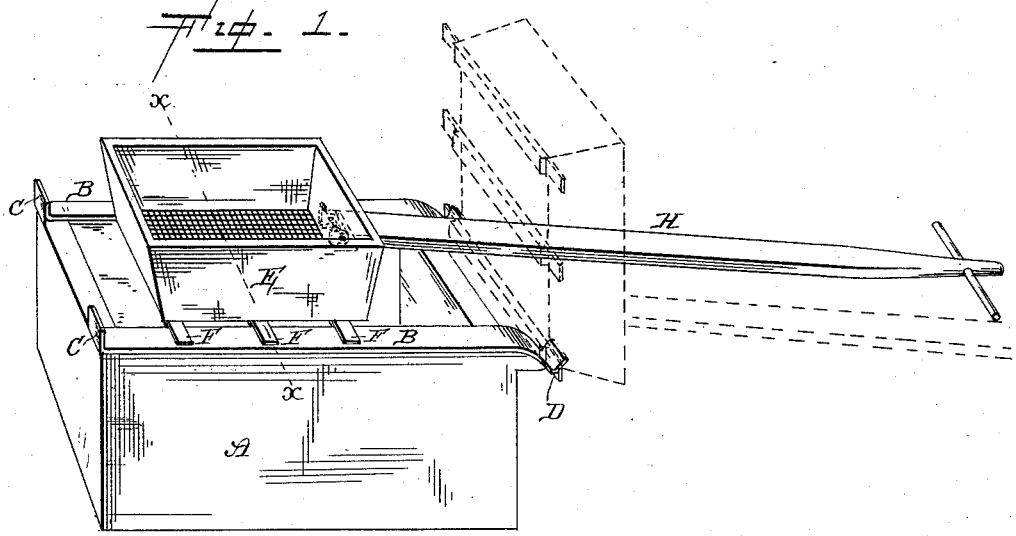
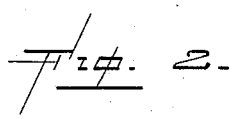
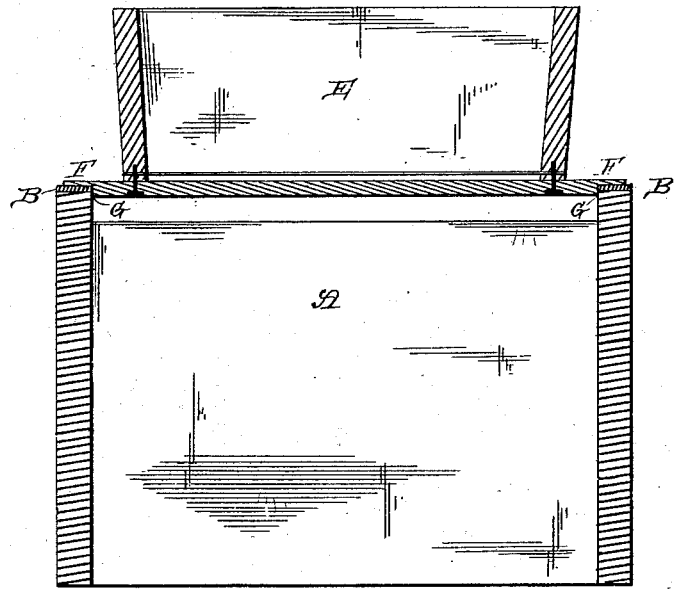
Witnesses.
Louis F. Gardner
J. W. Garner
Inventor.
U. E. Dodge
per
F. A. Lehmann, Atty

UNITED STATES PATENT OFFICE.

ULYSSES E. DODGE, OF FREDONIA, NEW YORK.

ASH-SIFTER.

SPECIFICATION forming part of Letters Patent No. 279,724, dated June 19, 1883.

Application filed April 17, 1883. (No model.)

*To all whom it may concern:*

Be it known that I, U. E. DODGE, of Fredonia, in the county of Chautauqua and State of New York, have invented certain new and useful Improvements in Ash-Sifters; and I do hereby declare the following to be a full, clear, and exact description of the invention, such as will enable others skilled in the art to which it pertains to make and use it, reference being had to the accompanying drawings, which form part of this specification.

My invention relates to an improvement in ash-sifters; and it consists in the combination of a suitable frame, which is provided with metallic strips upon its top, which strips have their ends bent in such a manner as to form stops for the sifter when moved in one direction, and their opposite ends bent so as to allow the sifter to be tilted over when moved in the opposite direction, with a sifter provided with a pivoted handle and suitable ears or cross-pieces, which catch over the tops of the metallic strips, and thus serve as guides for the sifter as it is moved back and forth.

The object of my invention is to provide a sifter and suitable attachments therefor, whereby the sifter can be tilted over so as to discharge its contents into a suitable receptacle placed to receive them, without the necessity of touching the sifter with the hands or of removing it from its supporting frame.

In the accompanying drawings, Figure 1 is a perspective view of my invention, showing the sifter when in the act of being tilted in dotted lines. Fig. 2 is a vertical cross-section on the line $x\,x$ of Fig. 1.

A represents a rectangular box, of suitable construction, on the upper edges of which are placed metallic strips B, having their rear ends turned up at right angles, as at C, and their forward ends curved downward, and then turned upward, as at D.

E represents a sifter, which is provided with the projecting ears F, having the shoulders G for guiding them on the slides. Attached pivotally to the front side of this sifter is a handle, H, by means of which the operator can reciprocate the sifter back and forth on the slides without coming near enough to the sifter to get himself sprinkled with the ashes. The reciprocating action given to the sifter causes the ashes to be separated from the cinders, and when it is desired to empty the sifter of the cinders contained therein, it is only necessary to draw it to the inner end of the box and tilt it in the position shown in dotted lines in Fig. 1, when the cinders will be discharged from it.

As shown in Fig. 2, the sifter is provided with a removable screen, thus enabling screens having different-sized meshes to be substituted for one another, according to the varying kinds of substances to be sifted.

Having thus described my invention, I claim—

The combination of a suitable frame, provided with metallic strips upon its top, and which have their ends C D bent, as shown, with the sifter E, provided with the ears F, having the shoulders G, and the pivoted handle H, substantially as shown and described.

In testimony whereof I affix my signature in presence of two witnesses.

ULYSSES E. DODGE.

Witnesses:
W. B. ARCHIBOLD,
J. C. FRISBEE.